US012104899B2

(12) United States Patent
Wang

(10) Patent No.: US 12,104,899 B2
(45) Date of Patent: Oct. 1, 2024

(54) LENS POSITIONING DEVICE

(71) Applicant: GUANGZHOU LUXVISIONS INNOVATION TECHNOLOGY LIMITED, Guangzhou (CN)

(72) Inventor: Yu-Pin Wang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 491 days.

(21) Appl. No.: 17/568,729

(22) Filed: Jan. 5, 2022

(65) Prior Publication Data

US 2022/0214155 A1 Jul. 7, 2022

(30) Foreign Application Priority Data

Jan. 5, 2021 (CN) .......................... 202110007299.3

(51) Int. Cl.
*G01D 5/14* (2006.01)
*G01B 7/004* (2006.01)
*G01D 5/16* (2006.01)
*G02B 7/02* (2021.01)

(52) U.S. Cl.
CPC .............. *G01B 7/004* (2013.01); *G01D 5/145* (2013.01); *G01D 5/16* (2013.01); *G02B 7/02* (2013.01)

(58) Field of Classification Search
CPC .......... G02B 27/646; G02B 7/02; G02B 7/09; G02B 7/04; G02B 7/08; G01B 7/004; G01D 5/16; G01D 5/147; G01D 5/145; G01D 5/142
See application file for complete search history.

(56) References Cited

U.S. PATENT DOCUMENTS

| 10,324,141 | B2 * | 6/2019 | Latham | G01R 33/0005 |
| 2016/0161286 | A1 * | 6/2016 | Oeda | G01D 5/145 |
| | | | | 324/207.2 |
| 2019/0128699 | A1 * | 5/2019 | Uchida | G01D 5/145 |
| 2019/0285827 | A1 * | 9/2019 | Wu | G03B 19/22 |
| 2020/0209439 | A1 * | 7/2020 | Hu | G02B 3/14 |
| 2020/0209521 | A1 * | 7/2020 | Hu | G02B 26/004 |

* cited by examiner

*Primary Examiner* — Sharrief I Broome
*Assistant Examiner* — Journey F Sumlar
(74) *Attorney, Agent, or Firm* — JCIPRNET

(57) ABSTRACT

A lens positioning device including a lens carrier, a housing, three pairs of memory alloy wires and three displacement detecting units is provided. The three pairs of memory alloy wires are used to control the displacement of the lens carrier in three directions, respectively. Each of the displacement detecting units includes a magnetic element and a magnetic field sensing element. The magnetic field sensing element is arranged corresponding to the magnetic element to sense change of the magnetic field of the magnetic element along each of the three directions when the lens carrier moves. One magnetic element of any one of the three displacement detecting units is arranged at a position that can induce the corresponding magnetic field sensing element and does not interfere with the magnetic field sensing elements of the other two of the three displacement detecting units.

7 Claims, 2 Drawing Sheets

LENS POSITIONING DEVICE

CROSS-REFERENCE TO RELATED APPLICATION

This application claims the priority benefit of Chinese application no. 202110007299.3, filed on Jan. 5, 2021. The entirety of the above-mentioned patent application is hereby incorporated by reference herein and made a part of this specification.

BACKGROUND

Technical Field

The disclosure relates to a positioning device, and more particularly to a lens positioning device.

Description of Related Art

There is a lens device that uses a shape memory alloy to drive the lens to move, so as to achieve focus (AF) or hand vibration compensation (OIS). The principle of such lens device utilizes the thermal shrinkage and cold expansion characteristics of the shape memory alloy. After current passes through the alloy wire, the alloy wire is tightened due to the rise in temperature to pull the lens carrier. Moreover, when the alloy wire shrinks due to heat, its cross section and length change, and the resistance also changes accordingly. Therefore, the change in length can be inferred through the change in resistance to determine whether the lens carrier has been moved to the desired position.

However, because the resistance change and the length change of the shape memory alloy wire are not completely linearly related, especially when the length change increases or the operating temperature rises, there will be errors when the length of the alloy wire is inferred through the change of resistance, leading to inaccurate displacement accuracy. In addition, in detection of the resistance, if there are other losses, such as the resistance in the driving chip or the welding resistance between the actuator and the substrate, the overall resistance will vary, which will also cause errors in the calculation of the length of alloy wire.

SUMMARY

The disclosure provides a lens positioning device that can quickly and accurately position the lens.

A lens positioning device of the disclosure includes a lens carrier, a housing, three pairs of memory alloy wires and three displacement detecting units. The lens carrier is provided with a lens. The housing has an accommodating space for accommodating the lens carrier, and the lens protrudes from the opening of the housing. The three pairs of memory alloy wires are used to control the displacement of the lens carrier in three directions, respectively. The three directions are orthogonal to one another. Each of the displacement detecting units includes a magnetic element and a magnetic field sensing element. The magnetic element is arranged on the lens carrier. The magnetic field sensing element is arranged on the housing and corresponding to the magnetic element to sense change of the magnetic field of the magnetic element along each of the three directions when the lens carrier moves. One magnetic element of any one of the three displacement detecting units is arranged at a position that can induce the corresponding magnetic field sensing element and does not interfere with the magnetic field sensing elements of the other two of the three displacement detecting units.

In an embodiment of the disclosure, the lens positioning device further includes a control unit. The control unit is electrically connected to the three pairs of memory alloy wires and the three displacement detecting units. The control unit controls the displacement of the lens carrier in three directions by controlling the current of the three pairs of memory alloy wires, and the control unit is not provided with the control element used to calculate the resistance of three pairs of memory alloy wires.

In an embodiment of the disclosure, the three directions include a first direction, a second direction, and a third direction. The three pairs of memory alloy wires include a first pair of memory alloy wires, a second pair of memory alloy wires, and a third pair of memory alloy wires. The first pair of memory alloy wires, the second pair of memory alloy wires, and the third pair of memory alloy wires are used to control the displacement of the lens carrier in the first direction, the second direction, and the third direction, respectively.

In an embodiment of the disclosure, the lens carrier includes a first movable structure and a second movable structure. The housing includes a first fixing end and a second fixing end. The first movable structure and the second movable structure are arranged along a first diagonal direction of the lens carrier on the plane where the first direction and the second direction are located. The first fixing end and the second fixing end are arranged along a second diagonal direction of the lens carrier on the plane where the first direction and the second direction are located.

In an embodiment of the disclosure, two memory alloy wires of the first pair of memory alloy wires are respectively arranged on two opposite outer sides of the lens carrier in the second direction. Both ends of one memory alloy wire of the first pair of memory alloy wires are respectively connected to the first fixing end and the second movable structure, and both ends of the other memory alloy wire of the first pair of memory alloy wires are respectively connected to the second fixing end and the first movable structure to control the displacement of the both ends of the lens carrier in the first direction.

In an embodiment of the disclosure, two memory alloy wires of the second pair of memory alloy wires are respectively arranged on two opposite outer sides of the lens carrier in the first direction. Both ends of one memory alloy wire of the second pair of memory alloy wires are respectively connected to the first fixing end and the first movable structure, and both ends of the other memory alloy wire of the second pair of memory alloy wires are respectively connected to the second fixing end and the second movable structure to control the displacement of the both ends of the lens carrier in the second direction.

In an embodiment of the disclosure, the lens carrier includes a first hook structure and a second hook structure, and the first hook structure and the second hook structure are disposed on the lateral surface of the lens carrier along a third direction. The housing further includes a first pair of fixing ends and a second pair of fixing ends. The first pair of fixing ends and the second pair of fixing ends are respectively disposed on both sides of the housing in the third direction. Both ends of one memory alloy wire of the third pair of memory alloy wires are respectively connected with the ends of the first pair of fixing ends. One memory alloy wire of the third pair of memory alloy wires controls the displacement of one end of the lens carrier in the third direction in the manner of returning back to one side of the third direction after winding the first hook structure. Both ends of the other memory alloy wire of the third pair of memory alloy wires are respectively connected to the ends of the second pair of fixing ends. The other memory alloy wire of the third pair of memory alloy wires controls the displacement of the other end of the lens carrier in the third direction in the manner of returning back to the other side of the third direction after winding the second hook structure.

Based on the above, the lens positioning device of the disclosure can calculate the displacement of the lens carrier in three different directions through the arrangement of the magnetic elements and magnetic field sensing elements of the three displacement detecting units. In addition, since the data obtained by the above detection method will not be interfered by the deformation of the memory alloy wire or external resistance or temperature or other factors, the obtained values will be more accurate. Moreover, the method is adaptable for situations that require a greater amount of displacement, and has a faster response speed and can perform detection quickly. Furthermore, there is no need for the lens positioning device to be provided with the control element for calculating the resistance of the three pairs of memory alloy wires, the product cost can be reduced.

DESCRIPTION OF THE EMBODIMENTS

Figure 1:
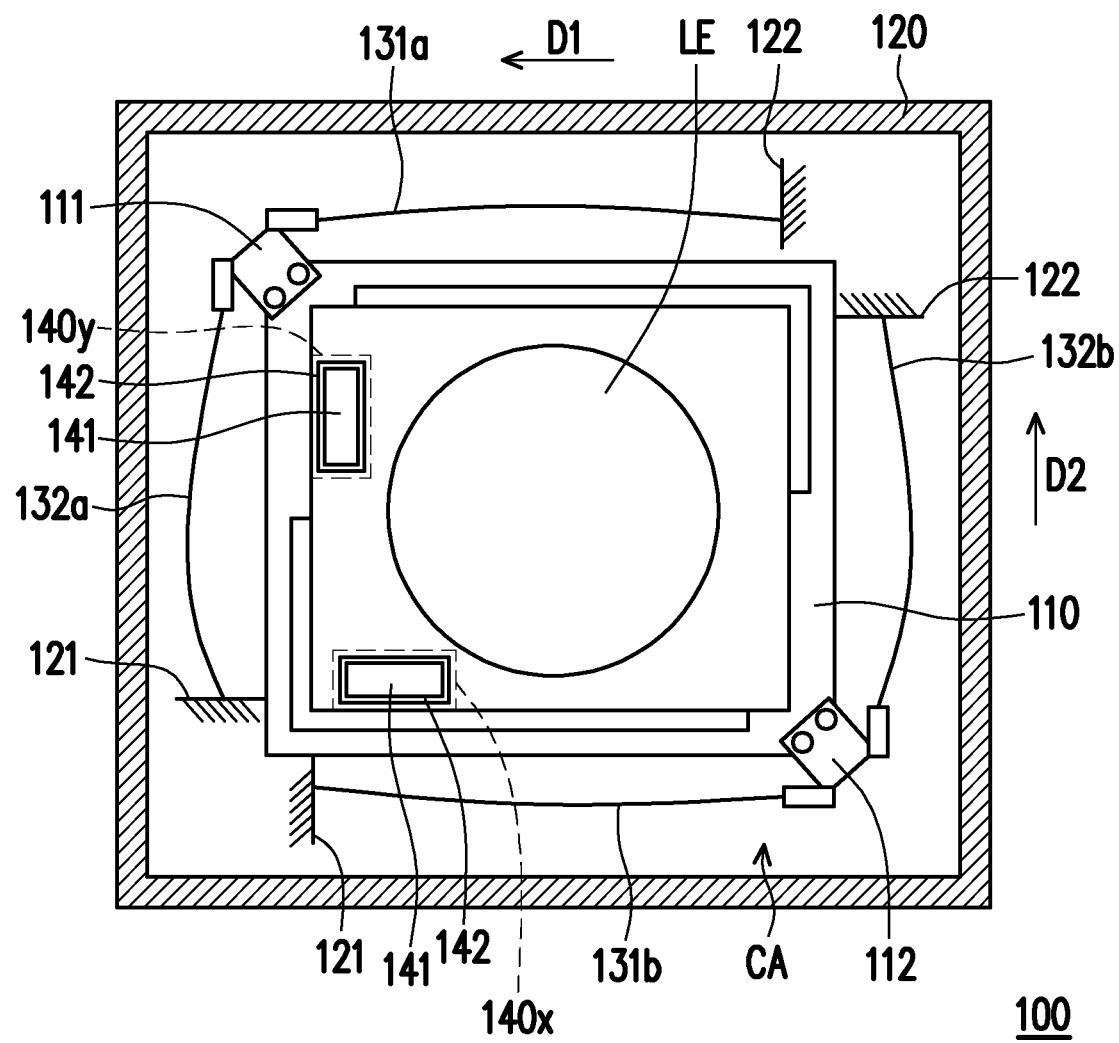
FIG. 1 is a bottom view of a lens positioning device according to an embodiment of the disclosure.
Figure 2:
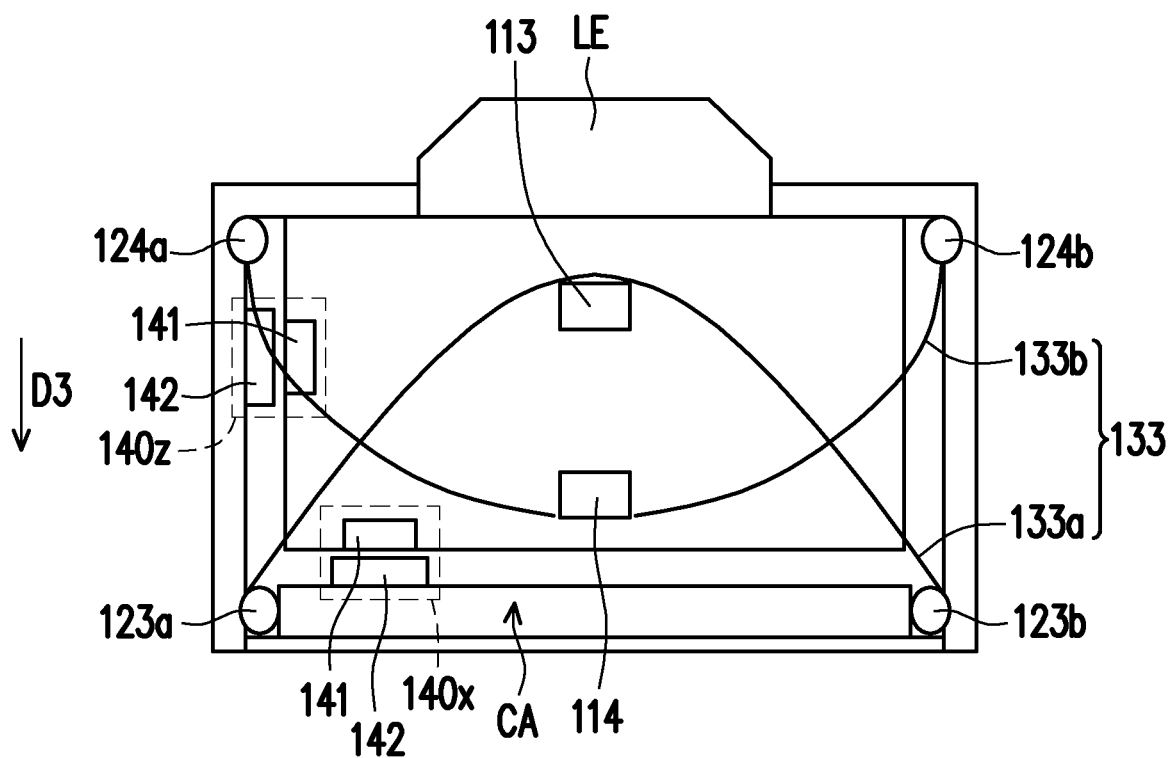
FIG. 2 is a schematic view of the lens positioning device of FIG. 1.

FIG. 1 is a bottom view of a lens positioning device according to an embodiment of the disclosure. FIG. 2 is a schematic view of the lens positioning device of FIG. 1. Please refer to FIG. 1 and FIG. 2. A lens LE positioning device 100 of the embodiment includes a lens carrier 110, a housing 120, three pairs of memory alloy wires 130, three displacement detecting units 140$x$, 140$y$ and 140$z$, and a control unit (not shown). The lens carrier 110 is provided with a lens LE. The housing 120 has an accommodating space CA for accommodating the lens carrier 110, and the lens LE protrudes from the opening of the housing 120. The three pairs of memory alloy wires 130 are used to control the displacement of the lens carrier 110 in three directions, respectively. More specifically, the three directions include a first direction D1, a second direction D2, and a third direction D3, which are orthogonal to one other. The three pairs of memory alloy wires 130 include a first pair of memory alloy wires 131, a second pair of memory alloy wires 132, and a third pair of memory alloy wires 133. The first pair of memory alloy wires 131, the second pair of memory alloy wires 132, and the third pair of memory alloy wires 133 are used to control the displacement of the lens carrier 110 in the first direction D1, the second direction D2, and the third direction D3, respectively.

Further, the control unit is electrically connected to the three pairs of memory alloy wires 130 and the three displacement detecting units 140$x$, 140$y$, and 140$z$. The control unit controls the current of the three pairs of memory alloy wires 130 and utilizes the thermal shrinkage and cold expansion characteristics of the shape memory alloy. When the control unit controls the current to pass through the alloy wire, the alloy wire is tightened due to the rise in temperature. In this way, the control unit can control the displacement of the lens carrier 110 in three directions.

For example, as shown in FIG. 1, the lens carrier 110 includes a first movable structure 111 and a second movable structure 112. The housing 120 includes a first fixing end 121 and a second fixing end 122. The first movable structure 111 and the second movable structure 112 are arranged along a first diagonal direction of the lens carrier 110 on the plane where the first direction D1 and the second direction D2 are located, and the first fixing end 121 and the second fixing end 122 are arranged along a second diagonal direction of the lens carrier 110 on the plane where the first direction D1 and the second direction D2 are located.

Moreover, as shown in FIG. 1, two memory alloy wires 131$a$ and 131$b$ of the first pair of memory alloy wires 131 are respectively arranged on two opposite outer sides of the lens carrier 110 in the second direction D2. Both ends of one memory alloy wire 131$b$ of the first pair of memory alloy wires 131 are respectively connected to the first fixing end 121 and the second movable structure 112, and both ends of the other memory alloy wire 131$a$ of the first pair of memory alloy wires 131 are respectively connected to the second fixing end 122 and the first movable structure 111. In this way, when the control unit controls the current to pass through the first pair of memory alloy wires 131, the rise of temperature makes the first pair of memory alloy wires 131 to be tightened, so that the control unit can control displacement of both ends of the lens carrier 110 in the first direction D1.

Similarly, as shown in FIG. 1, two memory alloy wires 132$a$ and 132$b$ of the second pair of memory alloy wires 132 are respectively arranged on two opposite outer sides of the lens carrier 110 in the first direction D1. Both ends of one memory alloy wire 132$a$ of the second pair of memory alloy wires 132 are respectively connected to the first fixing end 121 and the first movable structure 111, and both ends of the other memory alloy wire 132$b$ of the second pair of memory alloy wires 132 are respectively connected to the second fixing end 122 and the second movable structure 112. In this way, when the control unit controls the current to pass through the second pair of memory alloy wires 132, the rise of temperature makes the second pair of memory alloy wires 132 to be tightened, so that the control unit can control displacement of both ends of the lens carrier 110 in the second direction D2.

On the other hand, as shown in FIG. 2, the lens carrier 110 further includes a first hook structure 113 and a second hook structure 114. The first hook structure 113 and the second hook structure 114 are disposed on the lateral surface of the lens carrier 110 along a third direction D3. The housing 120 further includes a first pair of fixing ends 123$a$ and 123$b$ and a second pair of fixing ends 124$a$ and 124$b$. The first pair of fixing ends 123$a$ and 123$b$ and the second pair of fixing ends 124$a$ and 124$b$ are respectively disposed on both sides of the housing 120 in the third direction D3. Both ends of one memory alloy wire 133$a$ of the third pair of memory alloy wires 133 are respectively connected with the ends of the first pair of fixing ends 123$a$ and 123$b$. One memory alloy wire 133$a$ of the third pair of memory alloy wires 133 is arranged in the manner of returning back to one side of the third direction D3 after winding the first hook structure 113. On the other hand, both ends of the other memory alloy wire 133$b$ of the third pair of memory alloy wires 133 are respectively connected to the ends of the second pair of fixing ends 124$a$ and 124$b$. The other memory alloy wire 133$b$ of the third pair of memory alloy wires 133 is arranged in the manner of returning back to the other side of the third direction D3 after winding the second hook structure 114.

In this way, when the control unit controls the current to pass through one memory alloy wire 133a of the third pair of memory alloy wires 133, the rise of temperature makes one memory alloy wire 133a of the third pair of memory alloy wires 133 to be tightened, so that the control unit can control displacement of one end of the lens carrier 110 in the third direction D3. On the other hand, when the control unit controls the current to pass through the other memory alloy wire 133b of the third pair of memory alloy wires 133, the rise of temperature makes the other memory alloy wire 133b of the third pair of memory alloy wires 133 to be tightened, so that the control unit can control displacement of the other end of the lens carrier 110 in the third direction D3.

Furthermore, as shown in FIG. 1 and FIG. 2, each of the displacement detecting units 140x, 140y, and 140z includes a magnetic element 141 and a magnetic field sensing element 142. The magnetic element 141 is disposed on the lens carrier 110. The magnetic field sensing element 142 is disposed on the housing 120 and corresponding to the magnetic element 141 to sense change of the magnetic field of the magnetic element 141 along each of the three directions when the lens carrier 110 moves. Moreover, in this embodiment, the magnetic element 141 of any one of the three displacement detecting units 140x, 140y, and 140z is arranged at a position that can induce the corresponding magnetic field sensing element 142 and does not interfere with the magnetic field sensing elements 142 of the other two of the three displacement detecting units 140x, 140y, and 140z. For example, in this embodiment, the magnetic field sensing element 142 is a Hall sensor, but the disclosure is not limited thereto. In other embodiments, the magnetic field sensing element 142 may also be a giant magnetoresistive sensor (GMR), a tunnel magnetoresistive sensor (TMR), and other elements capable of detecting changes in a magnetic field.

In this way, when the lens carrier 110 moves, each magnetic element 141 also moves. Under the circumstances, the magnetic field received by its corresponding magnetic field sensing element 142 will change. Through sensing the change of magnetic field, the magnetic field sensing element 142 can calculate the displacement of the lens carrier 110 in three different directions. In this way, since the lens carrier 110 is positioned by each displacement detecting unit 140x, 140y, and 140z by sensing the change in magnetic field, it is no longer necessary to take into consideration the influence of external resistance or temperature changes on the calculation of displacement, and there is no need to take into account the problem of inaccurate calculation of resistance when there is a considerable amount of deformation of the memory alloy wire. The method is adaptable for the situation where a greater amount of displacement is required. In addition, because the lens carrier 110 is positioned by each displacement detecting unit 140x, 140y, and 140z by sensing the change in magnetic field, a faster response speed can be achieved, and the displacement of the lens carrier 110 can be acquired within the shortest time. Moreover, in this way, there is no need for the control unit to be provided with the control element for calculating the resistance of the three pairs of memory alloy wires 130, the product cost can be reduced.

In summary, the lens positioning device of the disclosure can calculate the displacement of the lens carrier in three different directions through the arrangement of the magnetic elements and magnetic field sensing elements of the three displacement detecting units. In addition, since the data obtained by the above detection method will not be interfered by the deformation of the memory alloy wire or external resistance or temperature or other factors, the obtained values will be more accurate. Moreover, the method is adaptable for situations that require a greater amount of displacement, and has a faster response speed and can perform detection quickly. Furthermore, there is no need for the lens positioning device to be provided with the control element for calculating the resistance of the three pairs of memory alloy wires, the product cost can be reduced.

What is claimed is:

1. A lens positioning device, comprising:
   a lens carrier, provided with a lens;
   a housing, having an accommodating space for accommodating the lens carrier, wherein the lens is protruded from an opening of the housing;
   three pairs of memory alloy wires, wherein the three pairs of memory alloy wires are respectively configured to control displacement of the lens carrier in three directions, and the three directions are orthogonal to one other; and
   three displacement detecting units, wherein each of the displacement detecting units comprises:
   a magnetic element, arranged on the lens carrier; and
   a magnetic field sensing element, provided on the housing and corresponding to the magnetic element to sense a change of a magnetic field of the magnetic element along each of the three directions when the lens carrier moves,
   wherein the magnetic element of any one of the three displacement detecting units is arranged at a position that can induce the corresponding magnetic field sensing element and does not interfere with magnetic field sensing elements of the other two of the three displacement detecting units.

2. The lens positioning device according to claim 1, further comprising:
   a control unit, electrically connected to the three pairs of memory alloy wires and the three displacement detecting units, wherein the control unit controls the displacement of the lens carrier in the three directions by controlling currents of the three pairs of memory alloy wires, and the control unit is not provided with a control element configured to calculate resistances of the three pairs of memory alloy wires.

3. The lens positioning device according to claim 1, wherein the three directions comprise a first direction, a second direction, and a third direction, the three pairs of memory alloy wires comprises a first pair of memory alloy wires, a second pair of memory alloy wires, and a third pair of memory alloy wires, the first pair of memory alloy wires, the second pair of memory alloy wires, and the third pair of memory alloy wires are configured to control the displacement of the lens carrier in the first direction, the second direction, and the third direction, respectively.

4. The lens positioning device according to claim 3, wherein the lens carrier comprises a first movable structure and a second movable structure, the housing comprises a first fixing end and a second fixing end, the first movable structure and the second movable structure are arranged along a first diagonal direction of the lens carrier on a plane where the first direction and the second direction are located, the first fixing end and the second fixing end are arranged along a second diagonal direction of the lens carrier on the plane where the first direction and the second direction are located.

5. The lens positioning device according to claim 4, wherein two memory alloy wires of the first pair of memory alloy wires are respectively arranged on two opposite outer sides of the lens carrier in the second direction, both ends of one memory alloy wire of the second pair of memory alloy wires are respectively connected to the first fixing end and the second movable structure, and both ends of the other memory alloy wire of the second pair of memory alloy wires are respectively connected to the second fixing end and the first movable structure to control displacement of both ends of the lens carrier in the first direction.

6. The lens positioning device according to claim 4, wherein two memory alloy wires of the second pair of memory alloy wires are respectively arranged on two opposite outer sides of the lens carrier in the first direction, both ends of one memory alloy wire of the first pair of memory alloy wires are respectively connected to the first fixing end and the first movable structure, and both ends of the other memory alloy wire of the first pair of memory alloy wires are respectively connected to the second fixing end and the second movable structure to control displacement of both ends of the lens carrier in the second direction.

7. The lens positioning device according to claim 3, wherein the lens carrier comprises a first hook structure and a second hook structure, and the first hook structure and the second hook structure are disposed on a lateral surface of the lens carrier along the third direction, the housing further comprises a first pair of fixing ends and a second pair of fixing ends, the first pair of fixing ends and the second pair of fixing ends are respectively disposed on both sides of the housing in the third direction, both ends of one memory alloy wire of the third pair of memory alloy wires are respectively connected with ends of the first pair of fixing ends, one memory alloy wire of the third pair of memory alloy wires controls displacement of one end of the lens carrier in the third direction in the manner of returning back to one side of the third direction after winding the first hook structure, both ends of the other memory alloy wire of the third pair of memory alloy wires are respectively connected to ends of the second pair of fixing ends, and the other memory alloy wire of the third pair of memory alloy wires controls displacement of the other end of the lens carrier in the third direction in the manner of returning back to the other side of the third direction after winding the second hook structure.

* * * * *